US009152407B2

(12) United States Patent
Zuverink (10) Patent No.: US 9,152,407 B2
(45) Date of Patent: Oct. 6, 2015

(54) METHOD FOR INITIATING SOFTWARE UPDATE THROUGH VERSION-AWARE CONTENT (75) Inventor: Dave Zuverink, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1426 days.

(21) Appl. No.: 12/429,553

(22) Filed: Apr. 24, 2009

(65) Prior Publication Data

US 2014/0250432 A1   Sep. 4, 2014

(51) Int. Cl.
G06F 9/445  (2006.01)
(52) U.S. Cl.
CPC ......................................... *G06F 8/65* (2013.01)
(58) Field of Classification Search
CPC ................................... G06F 9/44; A63F 13/00
USPC ............................. 705/50–79; 717/68; 463/42
See application file for complete search history.

(56) References Cited

U.S. PATENT DOCUMENTS

| 7,136,838 | B1* | 11/2006 | Peinado et al. ................. 705/59 |
| 7,519,911 | B2* | 4/2009 | Friedman ....................... 715/752 |
| 2003/0038838 | A1* | 2/2003 | Pollitt ............................. 345/741 |
| 2005/0144612 | A1* | 6/2005 | Wang et al. .................... 717/168 |
| 2006/0160622 | A1* | 7/2006 | Lee et al. ......................... 463/42 |
| 2011/0111696 | A1* | 5/2011 | Lazaridis .......................... 455/41.2 |

* cited by examiner

Primary Examiner — Calvin L Hewitt, II
Assistant Examiner — Nakia Leffall-Allen
(74) Attorney, Agent, or Firm — Kilpatrick Townsend & Stockton LLP (57) ABSTRACT Systems and methods are disclosed for updating players that run, display, or otherwise use electronically-stored content. Information is included in the content that not only indicates the player version needed to play the content, but also the existence of a newer player version. Content providing such an indication is termed "version-aware content" and allows a player to recognize that a newer player version exists. Version-aware content may be interpreted to provide a user with a message indicating that there is a newer version available. In another example, a player may automatically update based on the version-aware content's indication that a newer player exists. Content created to be compatible with older player versions can be created as version-aware content. Similarly, existing content can be modified to be version-aware content. In both cases, distribution of such content can encourage player updates and thus more rapid proliferation of a newer player version.

30 Claims, 5 Drawing Sheets

METHOD FOR INITIATING SOFTWARE UPDATE THROUGH VERSION-AWARE CONTENT

FIELD

This disclosure generally relates to updating software that runs, displays, or otherwise uses electronically-stored content and applications.

BACKGROUND

Various types of software are used to run, display, and otherwise use electronically-stored content and applications. These players and readers include, as examples, Adobe® Reader®, Adobe® Flash Player®, Adobe Flash Lite™, Microsoft® Internet Explorer®, Microsoft® Windows Media® Player, Microsoft® Silverlight™, iTunes®, iMovie®, and RealPlayer®. For simplicity, both "players" and "readers" are referred to herein simply as "players" and both "content" and "applications" are referred to simply as "content."

Players are updated from time to time with newer versions. In many circumstances, a newer version is able to play content that a prior version could not. For example, a new version of Adobe® Reader® may display content created on a corresponding new version of a content creation application, which, in this example, could be a new version of Adobe® Acrobat®. Users do not always immediately update their player software to the latest version. Aware of this issue, content authors may wait to adopt or fully utilize new versions of the corresponding authoring applications. For example, an author using Adobe® Acrobat® to create a .pdf may save a new .pdf in an earlier format to ensure its compatibility with more of the players used by its target audience. Authors may be particularly encouraged to create old version content for mobile devices for which downloading an updated player may be a greater inconvenience. Traditionally, a player notifies its user when it encounters content that requires a newer version. The user can then download, install, and use the newer version. Thus, the proliferation of newer versions of players is encouraged by the distribution of content requiring the newer versions. However, this proliferation is slowed by the tendency, described above, for authors to save content in older formats in order to maximize compatibility.

Various techniques have been employed to encourage adoption of a new version of a player. A player may itself be configured to periodically prompt the user to check for updates, as examples, every week or on every device restart. This prompting can become annoying, especially since there will often not be a new version available. An alternative to repetitive prompting is to enable automatic update checking. A user may grant permission to a player to check for updates. However, this forces the user to sacrifice control and security. Moreover, the update checks may occur at inconvenient times, interrupt the user's other tasks, and incur network or data charges. Alternatively, a separate application could be used to monitor availability of newer versions of multiple player applications. This is also not ideal since the extra application needs to itself be installed, run, updated, and may also unnecessarily prompt a user to update and/or use network connectivity.

SUMMARY

Systems and methods are disclosed for updating players that run, display, or otherwise use electronically-stored content. Information is included in the content that not only indicates the player version needed to play the content, but also the existence of a newer version of the player. This information or trigger allows a player to recognize that a newer version exists. Content providing such an indication or trigger that a newer version exists beyond the version needed to play the content is referred to herein as "version-aware content." Various types of and uses for such version-aware content are contemplated. For example, a player can initiate an update based on receiving version-aware content. Version-aware content may be interpreted to provide the user with a helpful message indicating that there is, in fact, a newer version available for optional download. In another example, a player may automatically update or schedule an update based on the version-aware content's indication that a newer player exists.

Content created to be compatible with older player versions can be created as version-aware content. Similarly, existing content can be modified to be version-aware content. In both cases, distribution of the old-version content can still be used as a mechanism for encouraging player updates and thus more rapid proliferation of a newer player version. The use of version-aware content can provide some or all of the following advantages depending on the particular implementation. The use of version-aware content can reduce network traffic, associated charges, and/or user interruption by providing a new player indication in content that is already being provided to the user's device. Version-aware content can be used to reduce or eliminate the need for extra update-tracking software. The use of version-aware content can reduce the amount of unnecessary update related messages provided to a user, since a message need not be provided if an update is not available. In addition, the use of version-aware content can facilitate security by improving a user's ability to control updating and network access. Similarly, the use of version-aware content can facilitate updating at a time convenient for the user. For example, since the content itself is viewable by the player, the player can play the content while it downloads the update, as opposed to having to wait to download and install the update prior to playing the content.

One exemplary method involves receiving a piece of content to play on a computer apparatus. The computer apparatus has a first version of a content player providing instructions embodied in a computer-readable medium which configure the computer apparatus to play electronically-stored or electronically-transmitted content. The method further involves determining that a second, more recent version of the content player is available using the piece of content. This determination is made by identifying that the piece of content provides an indication that the second version of the content player is available. Once the computer apparatus recognizes that the second version is available, it can prompt the user to download/update or, assuming that the user allows automatic downloads, it may automatically download the second version of the content player to the computing apparatus.

Another exemplary method involves using a computer apparatus configured to create or modify content. The method involves modifying a piece of content represented by data embodied in a computer-readable medium and capable of playing on a first version of a content player. The piece of content is modified to include an indication that a second, more recent version of the content player is available. This exemplary method can also involve providing the modified piece of content for distribution to one or more computing apparatuses capable of playing the piece of content and interpreting the indication that the second version of the content player is available.

Yet another exemplary method comprises receiving content to play on a computer apparatus that already has a first content player and using an indication in the content to determine that a second content player is available for download and that the second content player provides something that is not provided by the first content player. For example, the second content player may be a different version of the first content player and thus may be capable of playing addition types of electronic content. As another example, the second content player may be a different application entirely than the first content player, providing different user interface and/or other features. The second content player may be manually or automatically downloaded to the computing apparatus to play the received content and/or to be available for playing other electronic content.

These exemplary embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Systems and methods are disclosed for updating players that play electronic content. Generally, a player can "play" electronic content by running, displaying, capturing, or otherwise using content that is electronically stored or transmitted. In certain embodiments, information is included in the electronic content that not only indicates the player version needed to play the content, but also the existence of a newer player version. Content providing such an indication is termed "version-aware content" and allows a player to recognize that a newer player version exists. Version-aware content may be interpreted to provide a user with a message indicating that there is a newer version available. In another example, a player may automatically update based on the version-aware content's indication that a newer player exists. Content created to be compatible with older player versions can be created as version-aware content. Similarly, existing content can be modified to be version-aware content. In both cases, distribution of such content can encourage player updates and thus more rapid proliferation of a newer player version.

An indicator can be included in content when the content is created. One example involves incorporating metadata in the content that an authoring tool creates. This metadata identifies the most recent version of an associated runtime that is available at the time the content is published. Both new and legacy authoring tools can provide this metadata. For example, a legacy authoring tool can itself be updated so that it can include the appropriate metadata in created content. When a player opens content that contains this information in the metadata, the user can be prompted to download and install an optional update to their player. This technique can be used alone or in conjunction with other traditional updating techniques to facilitate the proliferation and adoption of new versions of content players and new content formats. For example, this technique may target updating users who have declined automatic or random update checking. An indicator can also be added to existing content, for example, by a service that distributes existing content.

These illustrative examples are given to introduce the reader to the general subject matter discussed herein and are not intended to limit the scope of the disclosed concepts. The following sections describe various additional embodiments and examples of methods and systems for updating players that run, display, or otherwise use electronically-stored content.

Illustrative Networks and Computing Devices

Figure 1:
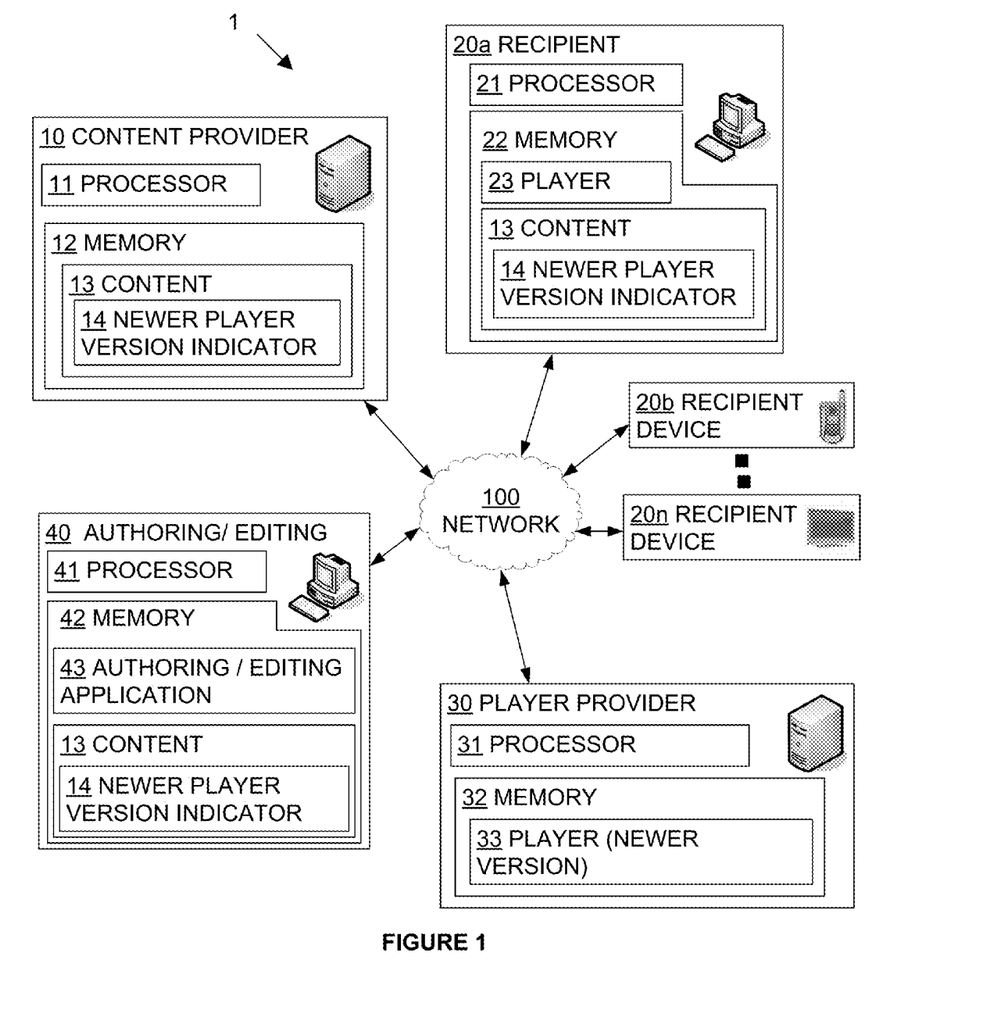
FIG. 1 is a system diagram illustrating an illustrative network environment according to certain embodiments.

Referring now to the drawings in which like numerals indicate like elements throughout the several Figures, FIG. 1 is a system diagram illustrating an illustrative network environment according to certain embodiments. Other embodiments may be utilized. The environment 1 shown in FIG. 1 comprises a wired or wireless network 100 connecting various network devices 10, 20a-n, 30, 40. Applications that execute on each of the devices 10, 20a-n, 30, 40 are shown as functional or storage components residing in memory 12, 22, 32, 42 on the respective devices. As is known to one of skill in the art, such applications may be resident in any suitable computer-readable medium and execute on any suitable processor. For example, the network devices 10, 20, 30, 40 shown each may comprise a computer-readable medium such as a random access memory (RAM) 12, 22, 32, 42 coupled to a processor 11, 12, 13, 14 that executes computer-executable program instructions stored in the memory 12, 22, 32, 42. Such processors 11, 12, 13, 14 may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise code from any suitable computer-programming language, including, for example, C, C++, C#, Visual Basic, Java, Python, Perl, and JavaScript.

The network 100 shown comprises the Internet. In other embodiments, other networks, intranets, combinations of networks, or no network may be used. The devices 10, 20a-n, 30, 40 can be connected to a network 100 as shown. Alternative configurations are of course possible. The devices 10, 20, 30, 40 may also comprise a number of external or internal devices such as a mouse, a CD-ROM, DVD, a keyboard, a display, audio speakers, or other input or output devices. The provider devices 10, 30 depicted as single computer systems, may be implemented as a network of computers, servers, or processors. Examples of a server device are servers, mainframe computers, networked computers, a processor-based device, and similar types of systems and devices.

An exemplary authoring/editing device 40 is a computing device that can be specifically configured to author or edit pieces of content. For example, an exemplary computer apparatus may comprise content editing software that provides instructions embodied in a computer-readable medium. When configured according to the instructions of the editing playing software, the computer apparatus is able to edit a piece of content. For example, the computer apparatus may be able to modify or add to data embodied in a computer-readable medium to include an indication that a more recent version of the content player is available. The exemplary authoring/editing device 40 shown in FIG. 1 comprises an authoring/editing application 43 and an exemplary piece of content 13 that has been modified (at creation or after creation) to include a newer player version indicator 14.

An exemplary content provider device 10 may be configured to provide a piece of content for distribution to one or more computing apparatuses, for example, by distributing the piece of content through a network 100 or making the content available for download through a network 100. The exemplary content provider 10 may receive content directly from a content authoring/editing device or otherwise. An authoring/editing device may also function as a content provider. The exemplary content provider 10 illustrates the piece of content 13 with the newer player version indicator 14 stored in memory 12 for distribution through network 100.

Recipients 20a-n are computing devices that can be specifically configured to receive and/or play pieces of electronically stored and/or electronically distributed content. For example, an exemplary computer apparatus may comprise content playing software that provides instructions embodied in a computer-readable medium. When configured according to the instructions of the content playing software, the computer apparatus is able to play electronically-stored or electronically-distributed content. For example, a device may display a graphics or video of a piece of content that is stored as an electronic file. As another example, a device may play the audio of a piece of content. Examples of devices include, but are not limited to, personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or media consuming programs. An exemplary recipient 20a comprises a content player 23 and the exemplary piece of content 13 with the newer player version indicator 14. The player 23 or another component of the recipient device 20a is able to interpret the newer player version indicator 14 to identify that a newer version (i.e., newer than the version of player 23) is available.

An exemplary player provider device 30 may be configured provide a player or a newer version of a player for distribution to one or more computing apparatuses, for example, by distributing the player through the network 100 or making the content available for download through the network 100. The exemplary content provider 30 may provide a content player to one or more of the recipient devices 20a-n upon request or otherwise. The exemplary player provider device 30 shown in FIG. 1 includes an exemplary player 33 for distribution in its memory 32.

Exemplary Methods of Using Version-Aware Content

Figure 2:
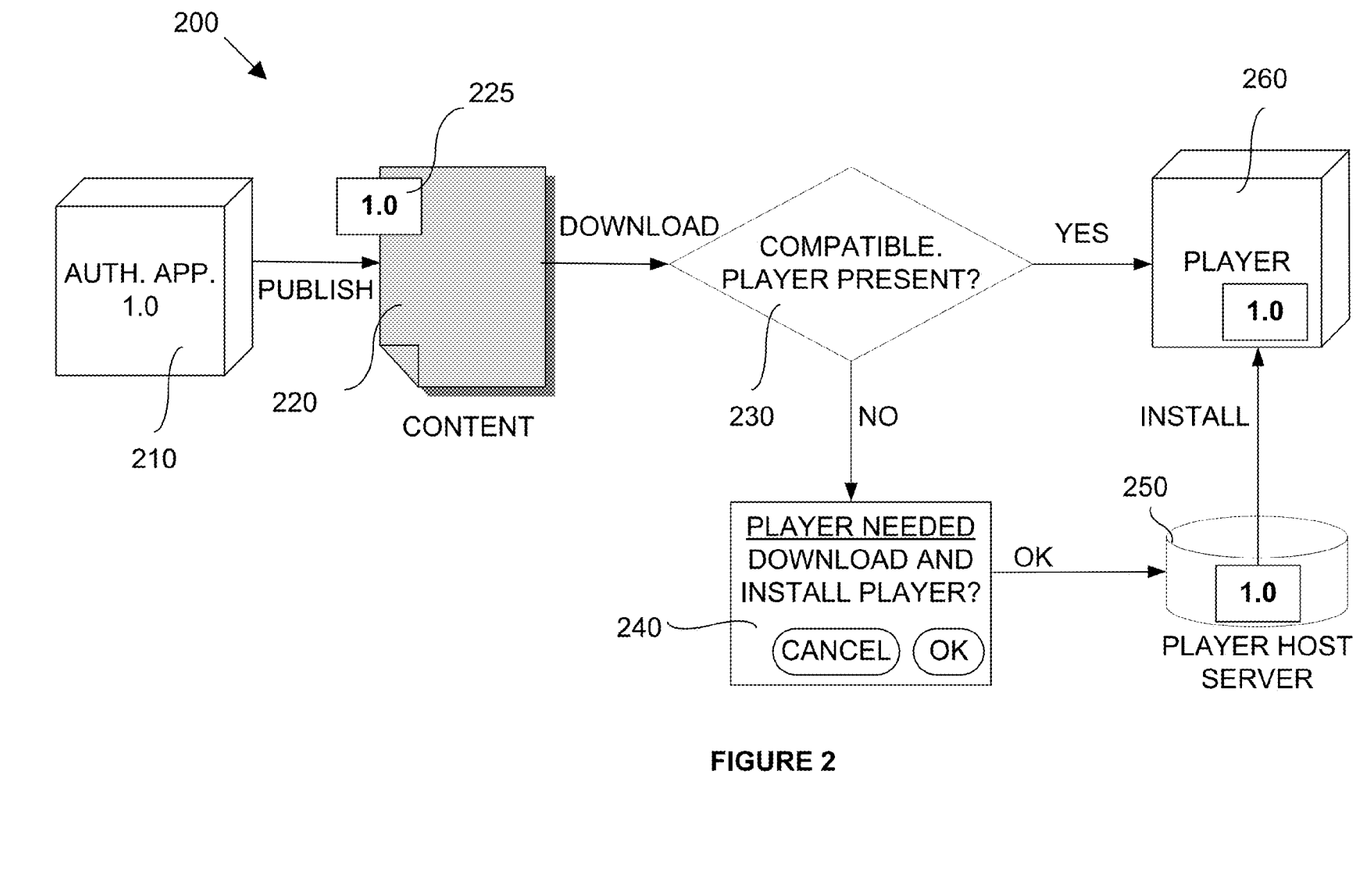
FIG. 2 is a flow chart illustrating an exemplary method of interpreting content according to certain embodiments.

FIG. 2 is a flow chart illustrating an exemplary method 200 of interpreting content according to certain embodiments. In the method 200 shown in FIG. 2, an authoring application 210 publishes a piece of content 220. The content 220 can be read by content player version 1.0 as indicated by the "1.0" shown at 225. Since content player version 1.0 is the most current version available in this example, the content 220 does not include any indication that a more recent version is available. In alternative embodiments, an indication could be provided that expressly identifies that a more recent version is not available. For example, such an indication could be included as metadata, a watermark, a fingerprint, or otherwise in the piece of content 220.

The user downloads the piece of content 220 to the user's computing device. The computing device determines whether a compatible player is present as shown in block 230. For example, the computing device may determine that the piece of content 225 is compatible with the player version 1.0 260 that is present on the computing device. If so, the computing device plays the piece of content 230. If a compatible player is not present, then the computing device presents a message 240 to the user stating "PLAYER NEEDED—DOWNLOAD AND INSTALL PLAYER." If the user cancels, the method ends. If the user selects to download and install the player, a player host server 250 provides the player 1.0 for installation on the computing device.

Since the piece of content 220 did not include an indication that a more recent player version is available, the exemplary method 200 did not need to check for or present the user an option to check for an update. In the alternative case where the piece of content 220 provides an express indication that a more recent version is not yet available, the method can similarly avoid having to check for or prompt for updates.

Figure 3:
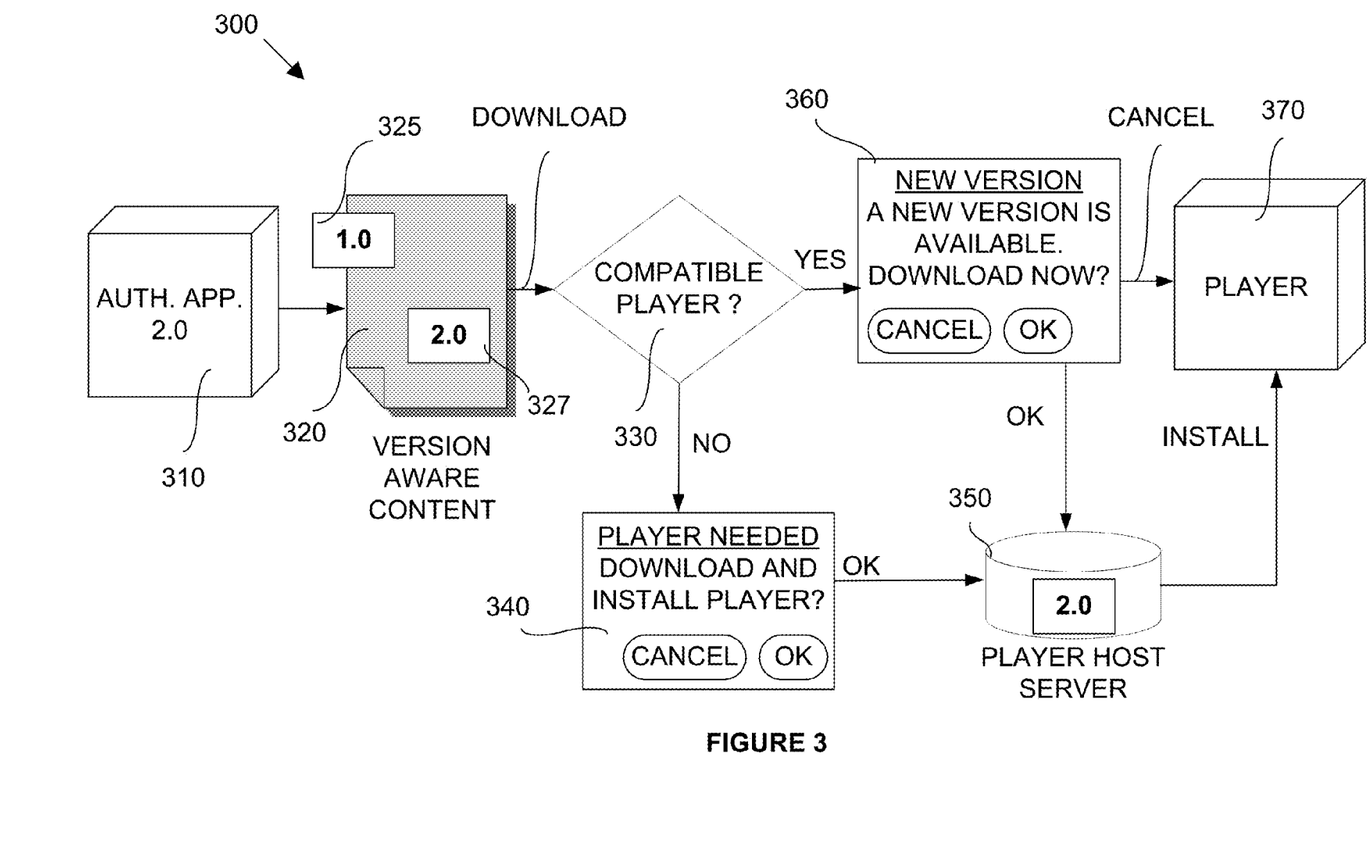
FIG. 3 is a flow chart illustrating another exemplary method of interpreting version-aware content according to certain embodiments.

FIG. 3 is a flow chart illustrating another exemplary method 300 of interpreting version-aware content according to certain embodiments. In the method 300 shown in FIG. 3, an authoring application 310 publishes a piece of content 320. The content 320 can be read by content player version 1.0 as indicated by the "1.0" shown at 325. Since content player version 1.0 is not the most current version available in this example, the content 220 includes an indication 327 that a more recent version is available. For example, such an indication could be included as metadata, a watermark, a fingerprint, or otherwise in the piece of content 320. In this example, the identification specifically identifies that version "2.0" of the content player is also available. An indicator 327, however, need not identify a particular version and need not even comprise words. For example, the indication may be a watermark of a particular pattern such that the presence of the watermark itself provides the indication. The indicator may, but need not, provide other information such as the location(s) from which the more recent version can be downloaded and specific details about the updated version of the content player.

In the method 300, the user downloads the piece of content 320 to the user's computing device. The computing device determines whether a compatible player is present as shown in block 330. For example, the computing device may determine that the piece of content 325 is compatible with the player version 1.0 370 that is present on the computing device. If a compatible player is not present, then the computing device presents a message 340 to the user stating "PLAYER NEEDED—DOWNLOAD AND INSTALL PLAYER." If the user cancels, the method ends. If the user selects to download and install the player, a player host server 350 provides the player 370 for installation on the computing device.

If a compatible player is present at block 330, the computing device identifies that a newer version is available. For example, the computing device may determine that its current version of the player (e.g., version 1.0) is capable of playing the content 320, and then recognize from the indicator 327 that a more recent version (e.g., version 2.0) is available elsewhere for download. In this exemplary method 300, the computer apparatus provides a prompt 360 to the user stating "NEW VERSION—A NEW VERSION IS AVAILABLE. DOWNLOAD NOW?" If the user selects OK, the computer device requests and receives the new version, for example, from player host 350. In alternative embodiments, the computing device simply downloads the new version of the player 370 automatically. In either case, the user computer apparatus does not need to unnecessarily check for updated content player versions.

Depending on the circumstances and/or user preferences these methods can involve various user prompts, downloading, and updating steps. Certain embodiments provide flexibility with respect to when these prompts, downloading, and updating steps are performed. For example, the computer apparatus can play the content prior to prompting the user to perform the download and/or update. Alternatively, the computer apparatus may prompt the user for the download/update prior to playing the content and then perform the download/update at the same time the content player is being downloaded. As yet another exemplary alternative, the computing apparatus can automatically download the new player while the content plays and then, upon conclusion of the playing of the content, prompts the user to install the downloaded new version., i.e., with a prompt stating "A NEW VERSION OF THE PLAYER HAS BEEN DOWNLOWED. INSTALL NOW?" Other alternatives allow a user to specify preferences with respect to downloading and updating so that the prompts are provided according to the user's preferences.

Figure 4:
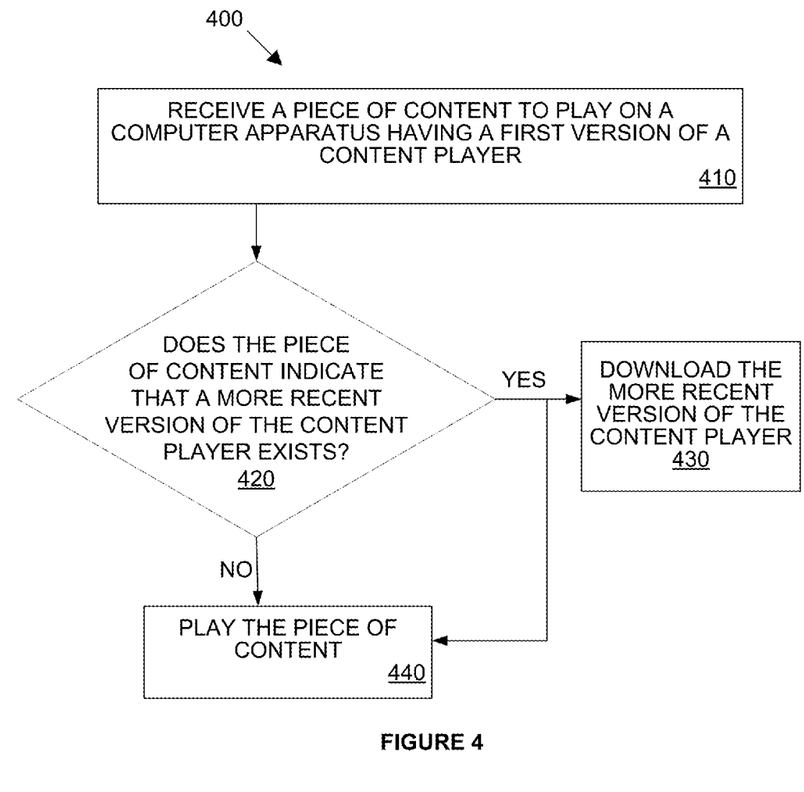
FIG. 4 is a flow chart illustrating an exemplary method of recognizing the existence of and downloading a more recent version of a content player according to certain embodiments.

FIG. 4 is a flow chart illustrating an exemplary method 400 of recognizing the existence of and downloading a more recent version of a content player according to certain embodiments. The method comprises receiving a piece of content to play on a computer apparatus, as shown in block 410. The computer apparatus comprises a first version of a content player providing instructions embodied in a computer-readable medium which configure the computer apparatus to play electronically-stored or electronically-transmitted content. The piece of content may have been requested by the computing apparatus and received through a network or other medium.

The method 400 further comprises determining whether the piece of content indicates that a more recent version of the content player is available, as shown in block 420. For example, a computing device currently using content player version 2.0 may recognize that version 3.0 is available from an indication in a piece of content that can be played on version 2.0. The more recent version of the content player may be the most recent version of the content player available. The method 400 may optionally provide one or more user prompts requesting permission to download and/or install the second version of the content player.

The method 400 further comprises, if the piece of content indicates that a more recent version of the content player is available, downloading the more recent version of the content player to the computing apparatus, as shown in block 430. Downloading the second version may occur before, after, or while the computer apparatus plays the piece of content 440. Prior to downloading and/or updating the content player the computer apparatus may request permission to do so, for example, by prompting a user for permission. The downloading, updating, and prompting that may occur can occur at a variety of useful sequences and times. For example, in one embodiment, the new version of the content player is downloaded while content plays and a prompt is provided upon the next initiation of content player, e.g., when the user next executes the content player to play another piece of content or otherwise, a prompt may indicate that the new version is downloaded and available for performing a local update. Downloading and updating may also be scheduled to occur during times when the device is used less, e.g., in the middle of the night, etc.

Figure 5:
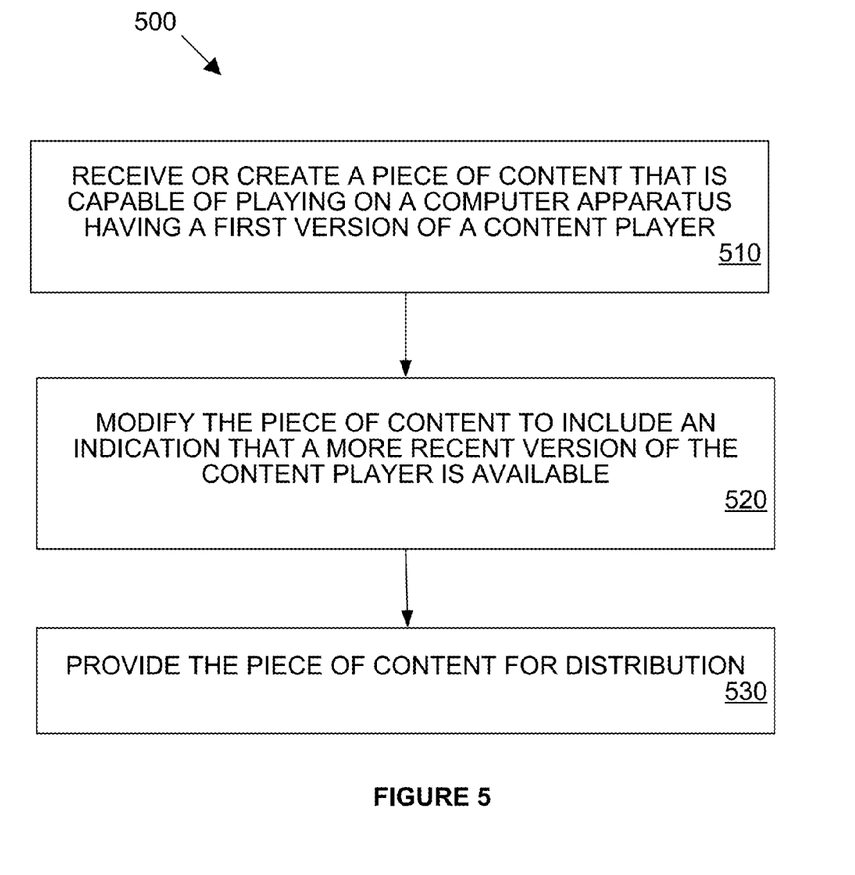
FIG. 5 is a flow chart illustrating an exemplary method of modifying a piece of content to create version-aware content according to certain embodiments.

FIG. 5 is a flow chart illustrating an exemplary method 500 of modifying a piece of content to create version-aware content according to certain embodiments. The method 500 involves receiving or creating a piece of content that is capable of playing on a computer apparatus having a first version of a content player, as shown in block 510. Such content may comprise data embodied in a computer-readable medium. The term "playing" is not used herein to imply that the content necessarily has a time component. For example, as described previously, a "player" can simply read content, e.g., by reading a document file or other static content. Word processors, document viewing applications, web page browsers, e-book reading devices, and e-mail applications and device, as examples, can thus be considered "players."

The method 500 further involves modifying the piece of content to comprise an indication that a more recent version of the content player is available, as shown in block 520. Modifying the piece of content may be performed during the original creation of the piece of content. Alternatively, modifying the piece of content may occur separately from the original creation of the piece of content. The modification of a piece of content may be performed, for example, by a content authoring application, a content hosting server, or by any other suitable application. In one embodiment, a content server updates all of its content for a given content player with appropriate indications whenever a new version of the content player is released or otherwise made available. An indication can but does not need to identify a particular version number.

The method 500 further comprises providing the piece of content for distribution, as shown in block 530. The piece of content may be provided for distribution, for example, through a network to one or more computing apparatuses capable of playing the piece of content and interpreting the indication that the more recent version of the content player is available.

General

Numerous specific details are set forth herein to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform, such as one or more computers or a similar electronic computing device or devices, that manipulate or transform data represented as physical electronic or magnetic quantities within memories, registers, or other information storage devices, transmission devices, or display devices of the computing platform.

The disclosed embodiments are merely illustrative. In short, the techniques and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

That which is claimed:

1. A computer-implemented method comprising:
receiving, by a computer apparatus, electronic content that comprises metadata;
determining, by the computer apparatus, compatibility of the electronic content with a first version of a content player, the computer apparatus comprising the first version of the content player-to play the electronic content;
playing the electronic content on the computer apparatus via the first version of the content player based on the determination that the electronic content is compatible with the first version of the content player;
determining, by the computer apparatus as it plays the electronic content, that a second version of the content player is available based at least in part on the metadata included in the electronic content, the metadata indicating that the second version of the content player is available;
downloading, by the computer apparatus, the second version of the content player to the computer apparatus, at least some of the downloading occurring simultaneously with or after playing the electronic content; and
installing, by the computer apparatus, the second version of the content player.

2. The method of claim 1, wherein downloading the second version of the content player occurs simultaneously while the computer apparatus plays the content.

3. The method of claim 1, wherein downloading the second version of the content player occurs after the computer apparatus plays the content.

4. The method of claim 1, wherein downloading the second version of the content player occurs before the computer apparatus plays the content.

5. The method of claim 1, further comprising providing a prompt requesting permission to download the second version of the content player.

6. The method of claim 1, further comprising providing a prompt requesting permission to install the second version of the content player.

7. The method of claim 1, further comprising first receiving an instruction to automatically download updates to the content player whenever available.

8. The method of claim 1, wherein the computing apparatus is a mobile computing device.

9. The method of claim 1, wherein the second version of the content player is more recent than the first version of the content player, 10. The method of claim 1, wherein the second version of the content player is the most recent version of the content player available.

11. The method of claim 1, wherein the electronic content is electronically-stored or electronically-transmitted.

12. A computer-implemented method comprising:
receiving content to play on a computer apparatus, the computer apparatus comprising a first version of a content player providing instructions embodied in a computer- readable medium which configure the computer apparatus to play electronically-stored or electronically-transmitted content,
if the content is not playable by the first version of the content player prompting for an instruction to download the content player;
if the content is playable by the first version of the content player, checking the content for an indication that a second version of the content player is available, wherein the second version of the content player is more recent than the first version of the content player; and
playing the content.

13. The method of claim 12 further comprising, if the content provides an indication that the second version is available, updating the content player by downloading and installing the second version of the content player on the computing apparatus.

14. The method of claim 13, wherein downloading the second version of the content player occurs while playing the content.

15. The method of claim 12 further comprising, if the content provides an indication that the second version is available, providing a prompt requesting permission to download the second version of the content player.

16. The method of claim 15, wherein providing the prompt occurs prior to playing the content.

17. The method of claim 15, wherein providing the prompt occurs after playing the content.

18. The method of claim 15, wherein providing a prompt occurs upon the next initiation of content player.

19. A computer-implemented method comprising:
modifying content on a computing apparatus configured to create or modify content comprising data embodied in a computer-readable medium and capable of playing on a first version of a content player, wherein the content is modified to comprise an indication that a second version of the content player is available, and wherein the second version of the content player is more recent than the first version of the content player; and providing the content for distribution to one or more computing apparatuses.

20. The method of claim 19, wherein modifying the content is performed during the original creation of the content.

21. The method of claim 19, wherein modifying the content occurs separately from the original creation of the content.

22. The method of claim 19, wherein at least some of the one or more computing apparatus are capable of playing the content and interpreting the indication that the second version of the content player is available 23. A mobile computing device comprising:
 a processor; and
 non-transitory computer readable medium storing executable instructions that when executed by the processor causes the processor to perform at least:
  receiving pieces of content from an authoring tool, the pieces of content comprising metadata comprising an indication that a more recent version of a content player is available;
  determining compatibility of the pieces of content with a version of the content player;
  playing the pieces of content utilizing the version of the content player based on the determination that the pieces of content are compatible with the version of the content player; and
  determining, while playing the pieces of content, whether the more recent version of the content player is available based at least in part on the metadata included in the pieces of content, and wherein, if the more recent version is available:
   downloading the more recent version of the content player, at least some of the downloading occurring simultaneously with or after playing the pieces of content, and
   installing, the second version of the content player.

24. The mobile computing device of claim 23 further comprising a display for displaying visual portions of the received pieces of content.

25. The mobile computing device of claim 23 further comprising a speaker for producing sound according to audio portions of the received pieces of content.

26. A computer-readable medium on which is encoded program code, the program code defining a piece of content for playing using a first version of a content player on one or more computing devices, and wherein the piece of content comprises an indication that a more recent version of the content player is available.

27. The computer-readable medium of claim 26, wherein the piece of content comprises a watermark or metadata that comprises the indication that a more recent version of the content player is available.

28. A computer-implemented method comprising:
 receiving, by a computer apparatus, content that comprises metadata that is included in the content during creation of the content by an authoring tool;
 determining, by the computer apparatus, compatibility of the content with a first content player, the computer apparatus comprising the first content player configured to play the content;
 playing the content on the computer apparatus via the first content player based on the determination that the content is compatible with the first content player;
 determining, by the computer apparatus as it plays the content, that a second content player is available based at least in part on the metadata included in the content, the metadata indicating that the second content player is available, the second content player providing a feature that is not provided by the first content player;
 downloading, by the computer apparatus, the second content player to the computer apparatus, at least some of the downloading occurring simultaneously with or after playing the content; and
 installing, by the computer apparatus, the second content player.

29. The method of claim 28, wherein the second content player is a different version of the first content player.

30. The method of claim 28, wherein the second content player is a different application than the first content player.

* * * * *